(12) United States Patent
Dobbin

(10) Patent No.: US 10,220,957 B2
(45) Date of Patent: Mar. 5, 2019

(54) TWO PART CAP

(71) Applicant: AIRBUS OPERATIONS LIMITED, Bristol (GB)

(72) Inventor: Richard Dobbin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 410 days.

(21) Appl. No.: 15/046,791

(22) Filed: Feb. 18, 2016

(65) Prior Publication Data
US 2016/0244181 A1 Aug. 25, 2016

(30) Foreign Application Priority Data
Feb. 20, 2015 (GB) .................................... 1502859

(51) Int. Cl.
| F16B 37/14 | (2006.01) |
| B64D 45/02 | (2006.01) |
| F16B 33/00 | (2006.01) |

(52) U.S. Cl.
CPC ............ *B64D 45/02* (2013.01); *F16B 33/004* (2013.01); *F16B 37/14* (2013.01)

(58) Field of Classification Search
USPC ................................................. 411/431, 377
See application file for complete search history.

(56) References Cited

U.S. PATENT DOCUMENTS

| 2012/0219380 A1 | 8/2012 | Hutter, III |
| 2013/0322982 A1 | 12/2013 | Dobbin |

(Continued)

FOREIGN PATENT DOCUMENTS

| EP | 2698318 A2 | 2/2014 |
| GB | 2517473 A | 2/2015 |

(Continued)

OTHER PUBLICATIONS

Search Report dated Apr. 23, 2015 in Great Britain Application No. 1502859.0.

(Continued)

*Primary Examiner* — Gary W Estremsky
(74) *Attorney, Agent, or Firm* — Nixon & Vanderhye P.C.

(57) ABSTRACT

A cap for forming a sealed cavity around an end of a fastener. The cap has an inner cap terminating at an inner cap rim which surrounds an opening into a central cavity and lies in an inner cap plane around a majority of a circumference of the inner cap. An outer cap is fitted over the inner cap, the outer cap comprising an outer cap body and a skirt extending from the outer cap body to a skirt rim which lies in or slightly below the inner cap plane around a majority of a circumference of the skirt. An annular pocket is provided between the skirt and inner cap, and a flow space is provided between the outer cap body and the inner cap. The flow space is in fluid communication with the annular pocket so that it can receive a flow of sealing material and feed it into the annular pocket. The outer cap body is formed from a first material with a first elastic modulus, and the skirt is formed from a second material with a second elastic modulus which is lower than the first elastic modulus. The skirt flexes as the flow of sealing material is fed into the annular pocket so that the skirt rim lifts up to form a gap between the skirt rim and the structure which enables air to escape the annular pocket by flowing through the gap.

20 Claims, 5 Drawing Sheets

(56) References Cited

U.S. PATENT DOCUMENTS

| | | |
|---|---|---|
| 2014/0048198 A1 | 2/2014 | Dobbin et al. |
| 2015/0184688 A1 | 7/2015 | Dobbin et al. |
| 2015/0300397 A1 | 10/2015 | Dobbin |
| 2016/0159493 A1 | 6/2016 | Dobbin et al. |

FOREIGN PATENT DOCUMENTS

| | | |
|---|---|---|
| JP | S553020 A | 1/1980 |
| JP | 2013119335 A | 6/2013 |
| WO | 2012107741 A1 | 8/2012 |
| WO | 2013178985 A1 | 12/2013 |
| WO | 2014072687 A2 | 5/2014 |
| WO | 2014170672 A1 | 10/2014 |
| WO | 2014170674 A1 | 10/2014 |
| WO | 2015015153 A1 | 2/2015 |
| WO | 2015025130 A1 | 2/2015 |

OTHER PUBLICATIONS

European Search Report dated Jul. 11, 2016 EP Application No. 16155777.

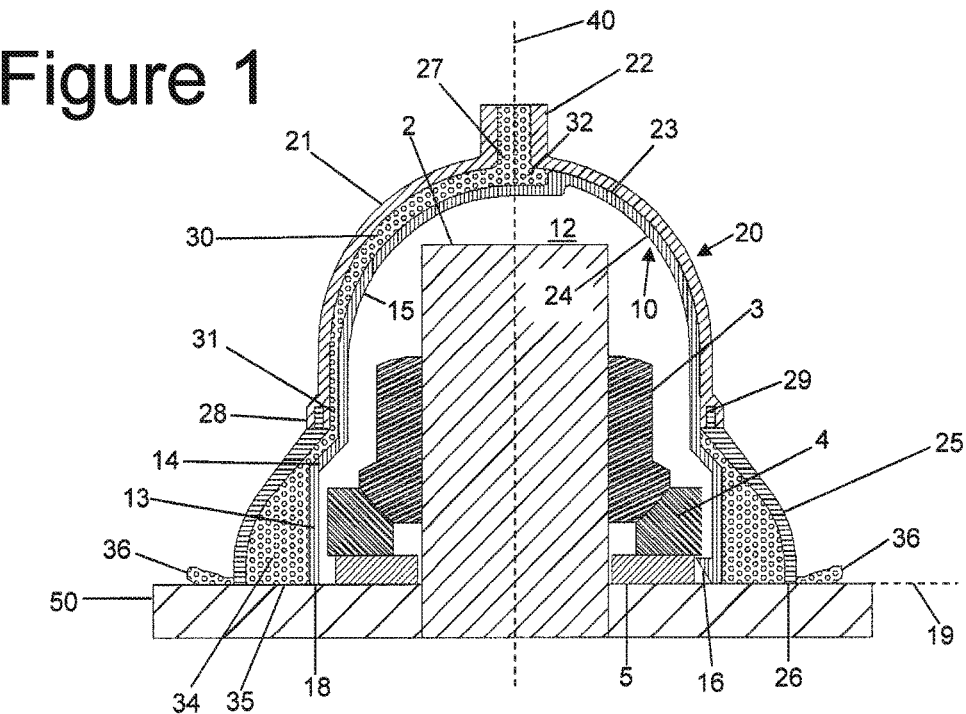
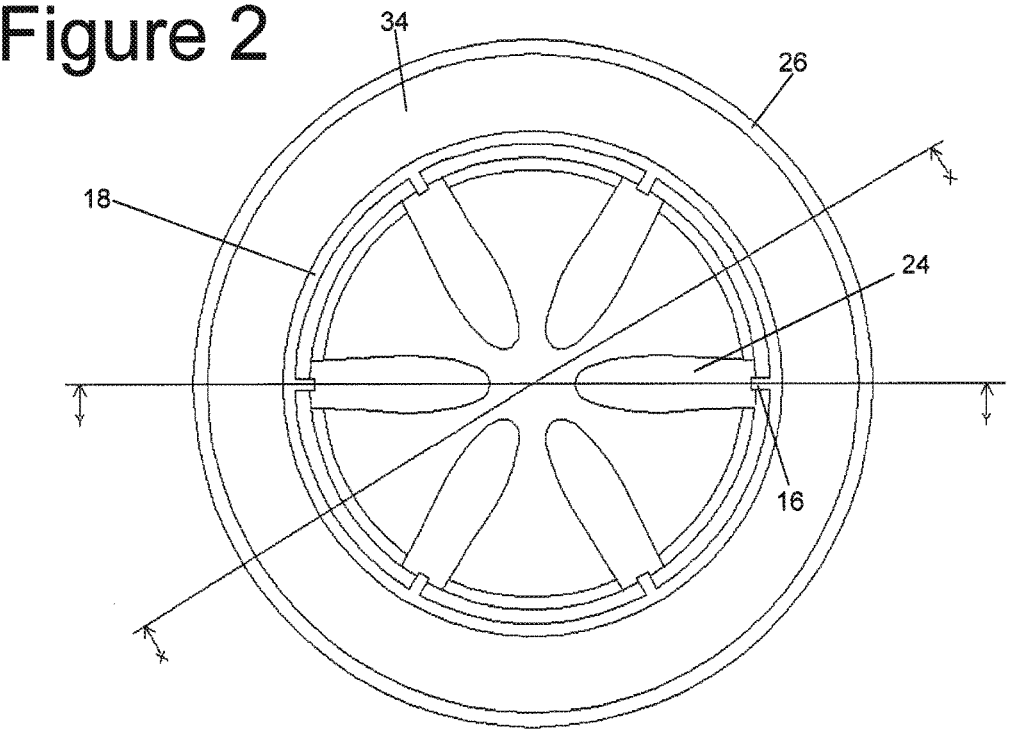

TWO PART CAP

RELATED APPLICATIONS

The present application claims priority from Great Britain Application Number 1502859.0, filed Feb. 20, 2015, the disclosure of which hereby incorporated by reference herein in its entirely.

FIELD OF THE INVENTION

The present invention relates to a cap for forming a sealed cavity around one end of a fastener, a joint comprising such a cap, and methods of manufacturing and installing such a cap.

BACKGROUND OF THE INVENTION

WO2013/178985, WO2014/170672 and WO2014/170674 disclose known injectable nut caps for forming a sealed cavity around an end of a fastener, the cap comprising: an inner cap terminating at an inner cap rim which surrounds an opening into a central cavity and lies in an inner cap plane around a majority of a circumference of the inner cap; an outer cap fitted over the inner cap, the outer cap comprising an outer cap body and a skirt extending from the outer cap body to a skirt rim; an annular pocket between the skirt and inner cap; and a flow space between the outer cap body and the inner cap. The flow space is in fluid communication with the annular pocket so that it can receive a flow of injected sealing material and feed it into the annular pocket. The sealing material in the annular pocket forms a bead which seals the central cavity and adheres the cap to a structure.

In such injectable nut caps the skirt rim is offset from the inner cap plane so that there is a continuous gap between the skirt rim and the structure. This gap enables air and sealing material to flow out from the annular pocket.

Furthermore, in such injectable nut caps the skirt extends at a small acute angle which increases at the skirt rim to form a raised lip. This raised lip ensures that the outer cap does not clash with features such as raised fillets.

A non-injectable nut cap is described in WO2012/107741. Inner and outer caps are supplied as a kit of parts. A metered quantity of sealant is applied into the outer cap during installation, or could be supplied pre-installed in the outer cap in a frozen state. The outer cap is pushed onto the inner cap, and the sealant is squeezed through a flow space between the outer and inner caps into contact with a structure.

SUMMARY OF THE INVENTION

A first aspect of the invention provides a cap for forming a sealed cavity around an end of a fastener, the cap comprising: an inner cap terminating at an inner cap rim which surrounds an opening into a central cavity and lies in an inner cap plane around a majority of a circumference of the inner cap; an outer cap fitted over the inner cap, the outer cap comprising an outer cap body, a skirt extending from the outer cap body to a skirt rim, wherein the skirt extends to the inner cap plane around a majority of a circumference of the skirt or through the inner cap plane inner cap plane around a majority of a circumference of the skirt; an annular pocket between the skirt and the inner cap; and a flow space between the outer cap body and the inner cap. The flow space is in fluid communication with the annular pocket so that it can receive a flow of sealing material and feed it into the annular pocket. The outer cap body is formed from a first material with a first elastic modulus, and the skirt is formed from a second material with a second elastic modulus which is lower than the first elastic modulus, Preferably the second elastic modulus is lower than the first elastic modulus by a factor of ten or more. Typically the first and second elastic moduli are Young's (tensile) moduli, but equivalently they may be shear moduli or bulk moduli.

In the injectable nut caps of WO2013/178985, WO2014/170672 and WO2014/170674, if the temperature of the air in the central cavity increases after the sealing material has been injected but before it cures, then the air may leak out of the central cavity and form air bubbles in the bead of un-cured sealing material. The continuous gap between the skirt rim and the structure means that the sealing material flows relatively easily out of the annular pocket to admit such air bubbles. The present invention provides a solution to this problem by extending the skirt so that the skirt rim lies in the inner cap plane around at least a majority of a circumference of the skirt (in contrast with the known injectable nut caps in which the skirt rim is offset from the inner cap plane). The extended skirt thus forms a barrier which inhibits air from leaking out of the central cavity and into the bead of un-cured sealing material. Forming the skirt from a material with a relatively low elastic modulus enables it to flex relatively easily to enable air to escape as the flow of sealing material is fed into the annular pocket.

Typically the cap is an injectable cap comprising an inlet hole in the outer cap, and the inlet hole is in fluid communication with the annular pocket via the flow space so that it can receive a flow of sealing material and feed it into the annular pocket via the flow space. Alternatively the cap may be a non-injectable cap in which a frozen charge of sealing material is pre-installed between the inner and outer caps, then thawed and extruded through the flow space into the annular pocket by moving the inner and outer caps together.

The inlet hole is preferably centred on a central axis of the cap. Such a central position ensures an even flow to the whole circumference of the annular pocket. Alternatively, the inlet hole may be offset from the central axis in order to enable installation of the cap in confined spaces.

If the cap is an injectable cap then typically the outer cap comprises a tube which projects outwardly from the outer cap and leads to the inlet hole. Such a tube can interconnect with a sealing material injection device to receive the flow of sealing material. Alternatively the outer cap may have an inlet hole with no projecting tube.

Typically the inner cap further comprises one or more projections, the (or each) projection extending inwardly into the central cavity so that it can contact the end of the fastener when the cap is installed. For instance each projection may comprise a hook and/or a ridge.

The skirt extends to the inner cap plane or through the inner cap plane around at least a majority of a circumference of the skirt. In one embodiment the skirt extends through the inner cap plane do that the skirt rim is offset from the inner cap plane, and in other embodiments the skirt extends only to the inner cap plane so that the skirt rim lies in the inner cap plane around a majority of the circumference of the skirt.

In one embodiment the skirt rim lies in the inner cap plane around a full circumference of the skirt, and in another it lies in the inner cap plane around only part of the circumference of the skirt. Similarly the inner cap rim lies in the inner cap plane around at least a majority of a circumference of the inner cap, Preferably the inner cap rim lies in the inner cap plane around a full circumference of the inner cap.

In some embodiments the skirt rim lies in a single plane around a full circumference of the skirt. In other embodiments the skirt rim lies in a single plane around a majority of the circumference of the skirt, except where the skirt, rim is formed with one or more recesses.

Typically the second material is an elastomer.

Typically the inner cap is formed from an inner cap material which also has an elastic modulus higher than the second elastic modulus. The inner cap material may be the same as the first material which forms the outer cap body, or it may be a different material.

Typically the flow space comprises a plurality of channels (preferably three or more), each channel having an outlet in fluid communication with the annular pocket so that it can receive a flow of sealing material and feed it into the annular pocket. Typically each channel also has a channel inlet arranged to receive the flow of sealing material.

The channels may be formed in an outer surface of the inner cap or an inner surface of the outer cap.

The inner or outer cap may be formed with channels on one side only, but more preferably the inner or outer cap has a corrugated shape. That is, either: the channels are formed in an outer surface of the inner cap and a plurality of corresponding channels are formed in an inner surface of the inner cap; or the channels are formed in an inner surface of the outer cap and a corresponding plurality of channels are formed in an outer surface of the outer cap. Forming the inner or outer cap with such a corrugated shape enables relatively narrow channels to be formed without resulting in a large amount of extra weight.

The inner or outer cap typically has side walls forming the channels with a substantially uniform wall thickness. This minimises the weight of the cap.

The channels may be shallow channels which extend over only part of the flow space between the inner and outer caps—the rest of the flow space providing a continuous interlay region. More preferably either: the channels are formed in the outer surface of the inner cap and separated by ridges which abut the inner surface of the outer cap; or the channels are formed in the inner surface of the outer cap and separated by ridges which abut the outer surface of the outer cap. Thus in this case the ridges divide the flow space into a plurality of channels and do not permit the sealing material to flow between the channels. The ridges may be joined to the other cap where they abut that other cap.

The cap may further comprise a reservoir which is arranged to distribute the flow of sealing material to the channels. In the case of an injectable cap the reservoir is arranged to receive the flow of sealing material from the inlet hole, and in the case of a non-injectable cap it is arranged to store a charge of frozen sealing material. The reservoir may comprise an open-topped chamber axially aligned with (i.e. positioned directly beneath) the inlet hole. Once filled with sealing material, the reservoir may be arranged to overflow to provide a uniform flow of sealing material in all radial directions.

The skirt may he attached to the outer cap body by a joint comprising a male part received in a groove which runs round a circumference of the cap. Optionally the male part is provided by the skirt and the annular groove is formed in the outer cap body.

A further aspect of the invention provides a joint comprising: a structure; an end of a fastener protruding from the structure; and a cap according to the first aspect of the invention forming a sealed cavity around the end of the fastener, the cap comprising a bead of sealing material in the annular pocket which secures the cap to the structure.

Optionally the skirt rim contacts the structure, although there may be sealing material between the structure and some (or all) of the skirt rim.

Optionally the inner cap rim contacts the structure (preferably around a full circumference of the inner cap rim) although there may be sealing material between the structure and some (or all) of the inner cap rim.

A further aspect of the invention provides a method of assembling the joint of the previous aspect, the method comprising: fitting the cap over the end of the fastener; and after the cap has been fitted over the end of the fastener, feeding a flow of sealing material into the annular pocket via the flow space to form the bead of sealing material.

Typically the flow of sealing material is fed into the annular pocket via the flow space by injecting it through an inlet hole in the outer cap. Since the sealing material can be injected after positioning of the cap over the end of the fastener it is possible to use sealing materials with short handling and curing times. The sealing material can be mixed in a sealing material injection device on application, thus ensuring that the material is applied during its working life and before it has started to cure. Quick cure sealing materials have the advantage of providing a stable bond very quickly. That is, the installed cap will be able to withstand accidental knocks or similar from assembly workers within a short timeframe.

Alternatively a frozen charge of sealing material is pre-installed between the inner and outer caps, then thawed and extruded into the annular pocket via the flow space by moving the inner and outer caps together.

Optionally the skirt rim contacts the structure, and the skirt flexes as the flow of sealing material is fed into the annular pocket so that the skirt rim lifts up to form a gap between the skirt rim and the structure which enables air to escape the annular pocket by flowing through the gap.

Prior to fitting the cap over the end of the fastener the skirt may extend through the inner cap plane around a majority of a circumference of the skirt—in other words it may extend beyond the inner cap rim. In this case, when the cap is fitted over the end of the fastener the skirt rim contacts the structure before the inner cap rim contacts the structure and then the skirt flexes to enable the inner cap rim to contact the structure.

A further aspect of the invention provides a method of manufacturing the cap of the first aspect, the method comprising co-bonding the skirt and the outer cap body.

The inner cap and outer cap body may be formed separately and then fitted together, or they may be formed integrally as a single part—for instance by additive layer manufacturing or 3D printing. Optionally the inner cap and outer cap body are secured to each other by a snap-fit joint or weld (ultrasonic, laser or any other welding technique).

The annular pocket provides a large contact area for the bead of sealing material which in turn provides a strong, reliable bond between the cap and structure in a relatively small footprint area. A good seal between the cap and structure is important, both to maintain a sealed volume of air within the central cavity so that the central cavity can safely contain out-gassing and sparking, and to prevent leakage of fuel or other materials into the central cavity.

After the sealing material has cured within the flow space, it serves to bond the inner cap to the outer cap. This bond provides the cap with additional strength, flexibility and shock resistance, and increased resistance to fuel ingress.

The annular pocket may have a generally flared shape such that its cross-sectional area decreases with distance from the inner cap plane. Thus, the area of the bead of sealing material in contact with the structure can be maximised without increasing the overall diameter of the cap. The skirt thus preferably at least part of the skirt extends at an acute angle to the inner cap. Alternatively the skirt may comprise a cylindrical portion which extends parallel with the inner cap, and a shoulder which extends outwardly from the inner cap at a right angle and joins the cylindrical portion to the outer cap body (which may be domed).

Preferably at least part of the skirt extends outwardly from the inner cap, either at an acute angle or at a right angle.

The annular parts of the cap (for instance the annular pocket, the inner cap rim, and the skirt rim) may form a generally circular shape around the circumference of the cap when view in plan, or they may form any other closed shape such as a hexagon or square (for instance to enclose a fastener with a hexagonal or square shape).

A cap according to the first aspect may enclose each end of the fastener, so that the joint is sealed from both sides of the structure.

The structure is preferably a structural component of an aircraft, more preferably a structural component of an aircraft wing, and most preferably a structural component of an aircraft wing which forms a boundary wall of a fuel tank.

The inner cap may or may not abut the fastener. If it abuts the fastener then it may abut the fastener via a plurality of ribs or hooks projecting from an inner surface of the inner cap.

Any of the optional, or desirable, features discussed above or below in relation to any of the aspects of the invention may be applied to any other aspect, either individually or in any combination.

BRIEF DESCRIPTION OF THE DRAWINGS

Embodiments of the invention will now be described with reference to the accompanying drawings, in which:

FIG. 1 is a cross-sectional view of a joint according to a first embodiment of the invention, with the nut cap viewed along a split section X-Y in FIG. 2;

FIG. 2 is a bottom view of the nut cap of the joint of FIG. 1;

DETAILED DESCRIPTION OF EMBODIMENT(S)

Figure 4:
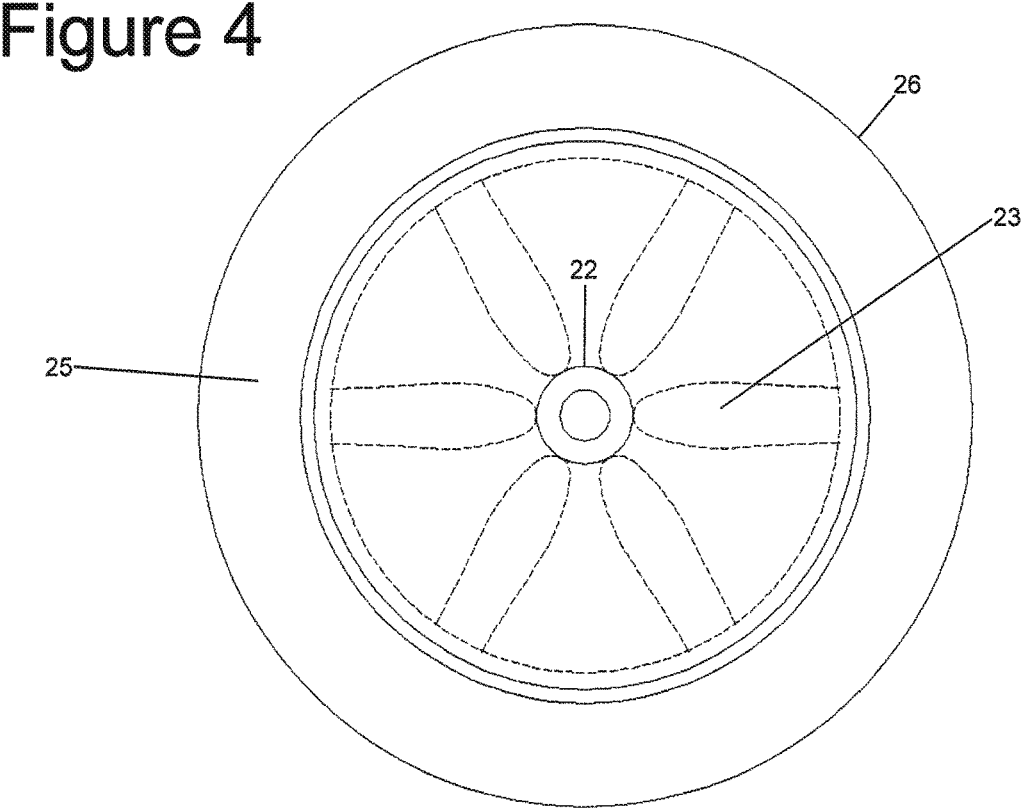
FIG. 4 is a plan view of the nut cap, with hidden parts of the inner cap shown in broken line.

An injectable nut cap shown in FIGS. 1, 2 and 4 comprises an inner cap 10 terminating at an inner cap rim 18 which surrounds an opening into a central cavity 12 and lies in an inner cap plane 19 around a full circumference of the inner cap. The inner cap 10 is generally made up of a cylindrical base 13, and a shoulder 14 joining the base 13 to a smaller diameter domed portion 15. An outer cap 20 is fitted over the inner cap. The outer cap has a domed outer cap body 21 with a cylindrical inlet tube 22 at its apex. The outer cap body 21 terminates at an internal edge 28, and a flared skirt 25 extends from the edge 28 of the outer cap body 21 to a skirt, rim 26. The skirt rim 26 lies in the inner cap plane 19 around a full circumference of the skirt 25. The inlet tube projects outwardly from the outer cap body 21 and leads to an inlet hole 27.

An annular pocket 34 is formed between the skirt 25 and the base 13 of the inner cap 10. The skirt 25 extends radially outwardly away from the base 13 at a small acute angle, Thus, the annular pocket 34 has a generally flared shape such that its cross-sectional area decreases with distance from the inner cap plane 19.

The inner cap 10 is injection moulded from a thermoplastic inner cap material such as glass-filled polyetherimide (PEI). A suitable inner cap material is a glass filled polyetherimide (PEI) resin such as Ultem 2400 or Ultem 2310, available from SABIC Innovative Plastics Holding BV.

The outer cap 20 is formed in two parts: a first part consisting of the domed outer cap body 21 and the inlet tube 22; and a second part consisting of the skirt 25. The outer cap body 21 and inlet tube 22 are formed from a first material, and the skirt 25 is formed from a more flexible second material. A suitable first material is a glass filled polyetherimide (PEI) resin such as Ultem 2400 or Ultem 2310, available from SABIC Innovative Plastics Holding BV. Typically the first material of the outer cap body 21 and inlet tube 22 is the same as the inner cap material. A suitable second material for the skirt 25 is a chemically resistant elastomer qualified for fuel tank and adherable to sealant, for example Viton (R) fluoroelastomer available from Du Pont, or a cured sealant material.

The first material has a first Young's (tensile) modulus and the second material has a second Young's modulus which is lower than the first Young's modulus. By way of example Ultem 2400 and Ultem 2310 typically have a Young's modulus of the order of 10,000 MPa, whereas Viton fluoroelastomers typically have a Young's modulus of the order of 1-10 MPa, which is lower by a factor of 1,000-10,000.

The outer cap is manufactured as follows. First, the skirt 25 is formed by injection moulding using an injection moulding tool. The skirt 25 has a projecting annular tongue 29 at its upper edge. Once the skirt 25 has cured, the outer cap body 21 and inlet tube 22 are formed by injecting the first material in liquid form into the same injection moulding tool. The liquid first material flows around the tongue 29 of the skirt to form a tongue-and-groove joint with the tongue 29 received in an annular groove in the lower edge of the outer cap body 21 as shown in FIG. 1. The first material then cools and cures so that the skirt 25 becomes co-bonded to the outer cap body 21.

In this embodiment the male part of the joint (tongue 29) is provided by the skirt 25 and the annular groove is formed in the lower edge 28 of the outer cap body 21. In an alternative embodiment this arrangement may be reversed—that is, with the male part provided by outer cap body 21 and the annular groove formed in the skirt. In this alternative embodiment the manufacturing process is also reversed—that is, the outer cap body 21 is formed initially, and then the skirt is formed subsequently so that the injected elastomer flows around the lower edge of the outer cap body 21 to form the tongue-and-groove joint.

The central cavity 12 encloses the tail end of a fastener protruding from a structure 50, which in this embodiment is a composite aircraft structural component, but may be a hybrid composite-metallic component. The fastener has an axially extending shaft 2 which passes through the structure, a nut 3 screwed onto the shaft 2, and a pair of washers 4, 5 between the nut 3 and the structure 50. The washers have spherical contacting surfaces which enable the shaft 121 to extend at an acute angle to the structure 50 (rather than at a right-angle as in FIG. 1).

The structure 50 may be a structural component of an aircraft wing, and most preferably a structural component of an aircraft wing which forms a boundary wall of a fuel tank. The structure 50 preferably comprises a composite structural component or a hybrid assembly of composite and metallic structural components, and the fastener comprises a metal fastener. In such cases a lightning strike may occur at the fastener or in an area immediately surrounding the fastener. The structure 50 typically comprises a pair of structural parts which are joined together by the fastener. In such aircraft applications the central cavity of the cap provides an air pocket which will safely contain out-gassing or sparking events that occur in the event of a lightning strike. The cap also provides a fluid tight seal around the end of the fastener, thus preventing fuel leakage into the central cavity 12.

When installed as in FIG. 1, the inner cap rim 18 abuts the structure 50 to fully encapsulate the tail end of the fastener within the central cavity 12, The base 13 of the inner cap is formed with six hooks 16 which project inwardly into the central cavity. The washer 5 has a slightly smaller outer diameter than the washer 4 so that a shallow annular recess is formed. The hooks 16 are received as a snap-fit in this recess, and the overhanging part of the washer 4 engages the hooks 16 to prevent the cap from being removed easily.

Figure 3:
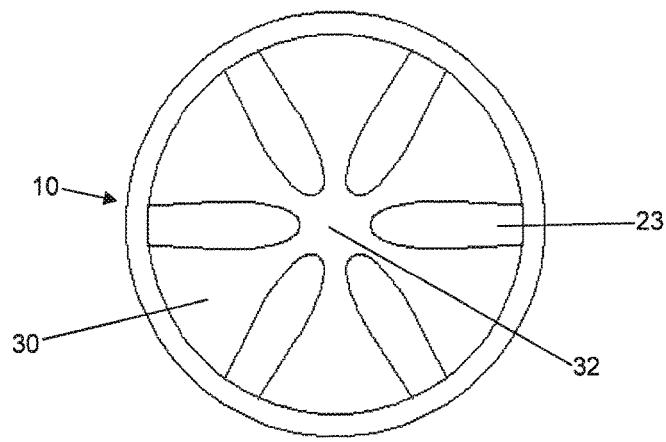
FIG. 3 is a plan view of the inner cap.

The inner cap 10 has side walls with a substantially uniform wall thickness as shown in FIG. 1. The side walls are corrugated. to form six petal-shaped ridges separated by channels. FIGS. 3 and 4 are plan views showing the protruding outer faces of the six ridges. FIG. 2 shows the inner cap from below, and therefore shows the recessed inner faces of the six ridges. The right-hand side of FIG. 1 shows a cross-section along a line Y through one of the six ridges which has a protruding outer face 23 and a recessed inner face 24. The left-hand side of FIG. 1 shows a cross-section along a line X through one of the six channels 30 between the ridges. The outer faces 23 of the ridges abut the inner surface of the domed portion 21 of the outer cap as shown in the right-hand side of FIG. 1.

A space is provided between between the inner and outer caps, and has three key regions: an annular pocket 34 between the skirt 25 and the base 13 of the inner cap; the six channels 30 between the ridges 23 in the inner cap; and a reservoir 32 at the apex of the dome where the channels 30 meet. Each channel 30 has an outlet 31 which leads into the annular pocket 34 so that it can receive a flow of sealing material from the reservoir 32 and feed it into the annular pocket 34.

The cap is installed in three stages. First the surface of the structure around the fastener is cleaned, abraded and treated with an adhesion promoter specific to the sealant material to be used. Second the cap is fitted over the fastener until the hooks 16 snap into place and the rims 18, 26 of the cap contact the structure 50. During this fitting stage the space 34, 30, 32 between the inner and outer caps contains air and no sealing material. Next, a sealing material injector gun is fitted to the inlet tube 22 and operated to inject a continuous flow of liquid sealing material into the space via the inlet hole 27.

A suitable sealing material is a polythioether aerospace sealant such as PR-2001 Class B:2, available from PPG Aerospace. An alternative sealing material is a two-part polysulphide based sealant or silicone based sealant. In this case the sealing material is thus typically an elastomer. A suitable polysulphide based sealant is MC-238 Class A/B, produced by Chemetall™. Two-part sealants can be supplied within a cartridge for application via an applicator gun, and are typically mixed within the cartridge before delivery via the nozzle of the gun. A further alternative sealing material is an epoxy based adhesive, most preferably a. two-part epoxy based structural adhesive such as Scotch-Weld™ 7256 B/A, produced by 3M™. Such epoxy based materials are normally used in applications in which its primary (or sole) purpose is to act as an adhesive, but in this case it acts as both an adhesive and a sealant. Such two-part adhesives are typically supplied in cartridge form (50 ml cartridges being preferred) and are mixed within the nozzle of an injector gun on application. Epoxy based adhesives are free-flowing, have a low viscosity, and exhibit rapid cure at room temperature. By mixing the two-part adhesive on application it is possible to use adhesives with very low working lives, for example only a few minutes.

The reservoir 32 is directly below the inlet hole 27 in the outer cap so that it receives sealing material directly therefrom. The reservoir 32 serves to improve the flow of sealing material into the sealing space by providing a relatively low flow resistance, and also serves to provide an even, uniform flow into the channels 30.

The channels 30 receive the flow of sealing material from the reservoir 32 and feed it into the annular pocket 34. As shown in FIG. 3, each channel 30 has a width which increases as it extends towards the annular pocket. This encourages the separate streams of sealing material from the different channels 30 to merge as they exit into the annular pocket. As shown in FIG. 1, each channel 30 also has a depth which decreases as it extends towards the annular pocket 34.

The annular pocket 34 is open at its lower face such that an annular bead 35 of sealing material which fills the annular pocket 34 contacts the structure 50. The flared shape of the annular pocket 34 provides a large adhesion area for the bead 35 of sealing material which, once cured, acts to seal the cap to the structure 50. Moreover, this large adhesion area is achieved within a relatively small footprint on the structure.

After the space between the inner and outer caps has been completely filled as shown in FIG. 1, the injector gun is removed and the sealing material is left to cure. Once cured, the bead 35 of sealing material in the annular pocket 34 bonds the cap to the structure 50, and the sealing material in the channels 30 bonds the inner cap 10 and outer cap 20 together, adding structural rigidity to the cap.

As well as bonding the cap to the structure 50, the bead 35 of cured sealing material also serves to fully seal the central cavity 12. Thus, trapped air within the central cavity 12 can provide a safe environment within which sparking and out-gassing events caused during a lightning strike can be contained. Ingress of fuel, water or other contaminants into the central cavity 12 is also prevented.

The sealing material injection method described above avoids the accumulation of air pockets (i.e. entrapment of air) in the annular bead 35 of sealing material during the injection process, since a uniformly distributed coverage of sealing material into the annular pocket 34 is achieved.

If the temperature of the air in the central cavity 12 increases after the sealing material has been injected but before it cures, then the air may try to leak out of the central cavity 12 and form air bubbles in the bead of un-cured sealing material. Extending the skirt so that the skirt rim 26 lies in the inner cap plane 19 around at least a majority of a circumference of the skirt means that the skirt 25 forms a barrier which inhibits such leakage.

If the surface of the structure 50 is perfectly planar than there will be no gaps between the structure 50 and the co-planar rims 18, 26 of the cap. The low Young's modulus of the skirt 25 makes it sufficiently flexible that as the sealing material flows into the annular pocket, the skirt flexes so that the skirt rim 26 lifts up to open one or more small gaps between the skirt rim 26 and the structure 50 which enable air to escape the annular pocket by flowing through the gap(s). After the injection process is complete the skirt rim 26 may return into full contact with the structure, or the small gap(s) may remain sealed by fingers of the sealing material. FIG. 1 shows two protruding fingers 36 of sealing material which have flowed through respective gaps between the skirt rim 26 and the structure 50 during the injection process.

If the surface of the structure 50 is not perfectly planar then there will be small gaps between the inner cap rim 18 and the structure. Any such small gaps are sealed by the bead 35 of cured sealing material. Similarly, there may be one or more small gaps between the skirt rim 26 and the structure and any such small gaps are also sealed by the bead 35 of cured sealing material.

Figure 5:
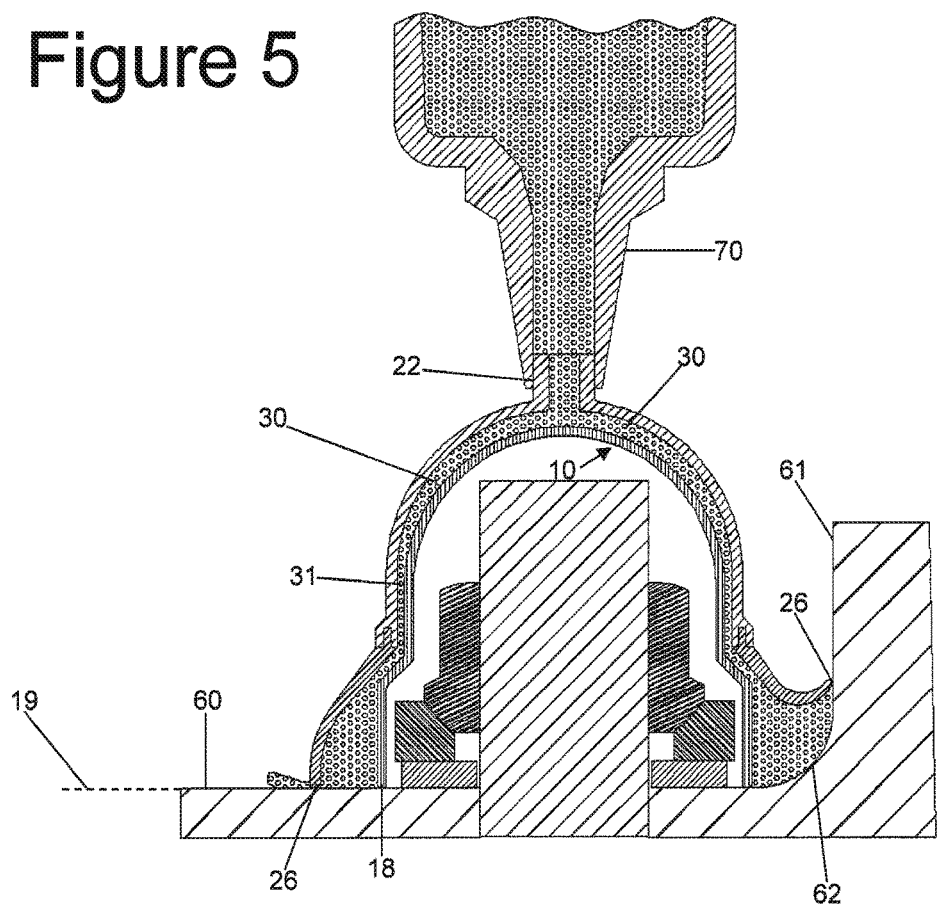
FIG. 5 is a cross-sectional view of a joint according to a second embodiment of the invention, with the nut cap viewed along a section X-X in FIG. 2 and also showing an injector gun.

FIG. 5 shows the cap of FIGS. 2-4 installed on a different structure. In this case the structure has a horizontal planar surface 60, and a raised fillet with a vertical planar surface 61 which meets the horizontal surface 60 at a curved radius 6:2.

FIG. 5 is taken along a single planar section X-X through the cap which passes through two opposite flow channels 30, in contrast to FIG. 1 which has a split section X-Y.

The inner cap rim 18 contacts the planar surface 60 of the structure around a full circumference of the inner cap rim 18 (assuming that the surface 60 is precisely planar). When the cap is an un-deformed state before it is installed on the structure, the skirt rim 26 lies in the inner cap plane 19 around its full circumference. When installed on the structure, the skirt rim 18 contacts the planar surface 60 of the structure around a majority of its circumference and the remaining part of the skirt rim 26 lifts up to accommodate the raised fillet as shown in FIG. 5.

The relatively low Young's modulus of the skirt 25 makes it sufficiently flexible to lift up easily to accommodate the raised fillet, as well as lifting up to enable air to escape during the injection process.

FIG. 5 also shows a nozzle 70 of an injector gun fitted to the tube 22 of the outer cap. The relatively high Young's modulus of the material forming the tube 26 and the inner cap 10 makes them stiff enough to enable the nozzle 70 to be pushed down firmly without deforming the inner cap 10, and ensures a liquid-tight connection between the nozzle 70 and the tube 22.

The injector gun may be powered manually, electrically, or by compressed air. The injector gun may be arranged to deliver a fixed volume of sealing material to thereby ensure a controlled and consistent application process.

Figure 6:
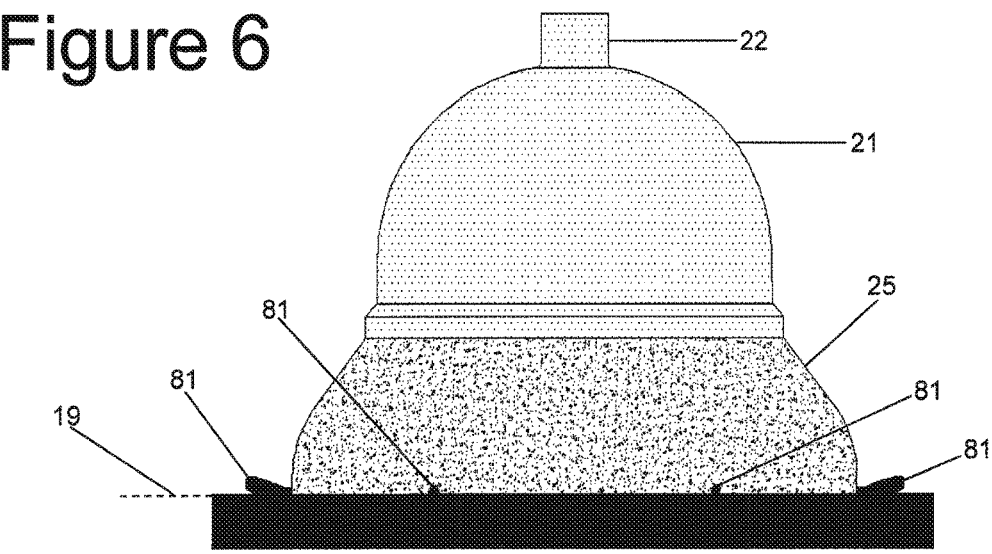
FIG. 6 is a side view of a joint according to a third embodiment of the invention.
Figure 7:
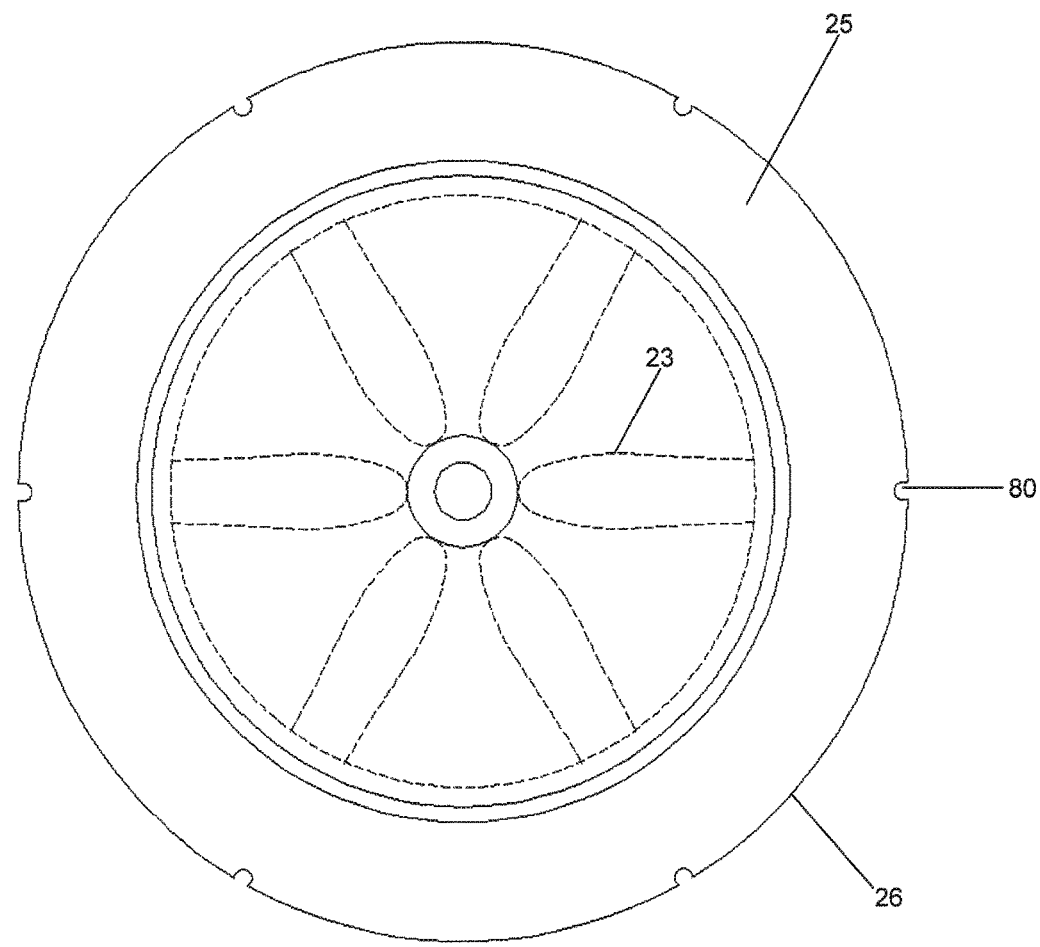
FIG. 7 is a plan view of the nut cap of FIG. 6, with hidden parts of the inner cap shown in broken line.

FIG. 7 is a plan view of a nut cap according to a second embodiment of the invention, and FIG. 6 shows the nut cap of FIG. 7 installed on a planar structure. The nut cap shown in FIGS. 6 and 7 is identical to the nut cap shown in FIGS. 1-5 (the same reference numbers being used to indicate equivalent parts) except that the skirt rim 26 is formed with six recesses 80.

As shown in FIG. 2, in the first embodiment the rims 18, 26 of the nut cap form continuous concentric circles, each circle centred on a cap axis 40 around its full circumference and lying in the inner cap plane 19 around its full circumference. In the second embodiment the skirt rim 26 forms a circle centred on the cap axis 40 which lies in the inner cap plane around a majority of its circumference except at the six recesses 80 as shown in FIG. 7. The circular parts of the skirt 26 between the recesses 80 lie in the inner cap plane 19 and contact the structure as shown in FIG. 6. As shown in FIG. 7, the recesses 80 are positioned in line with the ridges 23 in the inner cap, spaced apart equally by 60° around the cap axis 40.

The recesses 80 provide pre-formed outlets through which air can flow out of the annular pocket during the injection process. Therefore in the second embodiment the skirt rim 26 does not need to temporarily lift up to allow air to escape (although if the air cannot escape the recesses 80 sufficiently quickly then the skirt rim 26 may lift up slightly as in the first embodiment). When the annular pocket is full, then sealing material flows out of the recesses 80 to form protruding fingers 81 shown in FIG. 6. When an operator observes that all six fingers 81 of sealing material have emerged, then the injection process is stopped and the sealing gun removed. Providing such pre-formed outlets at known relative angular positions enables the operator to be confident that no air bubbles remain in the annular pocket.

In the embodiments of the invention discussed above, the ridges 23 and flow channels 30 are formed by corrugations of the inner cap 10, and the outer cap 20 has a smooth outer surface as shown most clearly in FIG. 6. This is preferred since the smooth outer surface of the outer cap does not attract dirt and has a profile with less impact on the flow of water or liquid over the cap. However in an alternative embodiment (not shown) the outer cap instead of the inner cap may be corrugated to form the ridges and flow channels.

Figure 8:
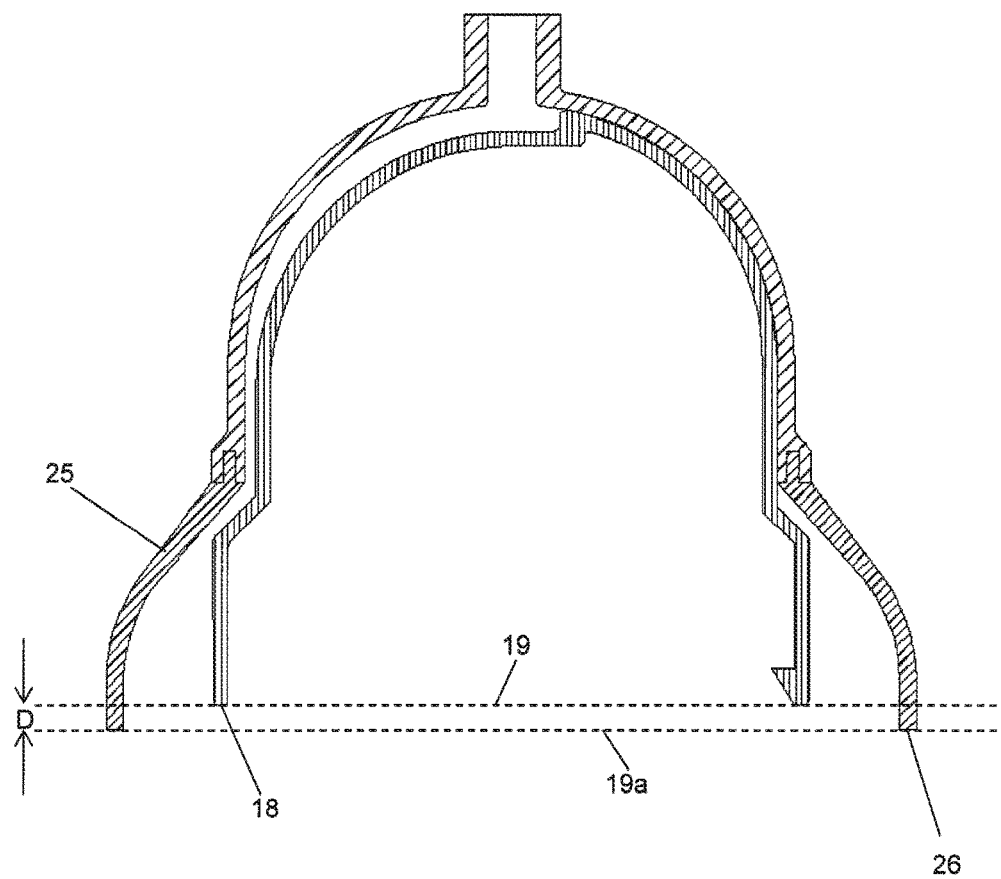
FIG. 8 is a cross-sectional view of a nut according to a fourth embodiment f the invention.

In the embodiments described above, prior to fitting the cap over the end of the fastener the skirt rim lies in the inner cap plane 19 around a majority of a circumference of the skirt. The nut cap shown in FIG. 8 is identical to the nut cap shown in FIGS. 1-5 (the same reference numbers being used to indicate equivalent parts) except that the skirt 25 extends through the inner cap plane 19 around a majority of a circumference of the skirt so that there is an offset D of up to 1.5 mm between the plane 19*a* of the skirt rim 26 and the inner cap plane 19. In the embodiments described above, when the cap is fitted over the end of the fastener the skirt rim 26 and inner cap rim 18 contact the structure at the same time. In the embodiment of FIG. 8 the skirt rim 26 contact the structure before the inner cap rim 18 contacts the structure, and then the skirt 25 flexes to enable the inner cap rim 18 to subsequently contact the structure. The skirt 25 is therefore in an energised state and applies an enhanced sealing force to the structure, improving the seal and enabling the skirt rim 26 to flex to account for any small undulations in the surface of the structure. Optionally the skirt rim 26 of the nut cap of FIG. 8 has recesses 80 like the embodiment of FIG. 7, or the skirt rim 26 may contact the structure around its full circumference as in the first embodiment.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around an end of a fastener, the cap comprising:
   a. an inner cap terminating at an inner cap rim which surrounds an opening into a central cavity and lies in an inner cap plane around a majority of a circumference of the inner cap;
   b. an outer cap fitted over the inner cap, the outer cap comprising an outer cap body, and a skirt extending from the outer cap body to a skirt rim, wherein the skirt extends to or through the inner cap plane around a majority of a circumference of the skirt,
   c. an annular pocket between the skirt and the inner cap; and
   d. a flow space between the outer cap body and the inner cap, wherein the flow space is in fluid communication with the annular pocket so that it can receive a flow of sealing material and feed it into the annular pocket;
   wherein the outer cap body is formed from a first material with a first elastic modulus, and the skirt is formed from a second material with a second elastic modulus which is lower than the first elastic modulus.

2. The cap of claim 1 further comprising an inlet hole in the outer cap, wherein the inlet hole is in fluid communication with the annular pocket via the flow space so that it can receive a flow of sealing material and feed it into the annular pocket via the flow space.

3. A cap according to claim 1, wherein the inner cap and outer cap are formed as separate parts.

4. The cap of claim 1 wherein at least part of the skirt extends at an acute angle to the inner cap.

5. The cap of claim 1 wherein the inner cap further comprises one or more projections, wherein at least one projection extends inwardly into the central cavity.

6. The cap of claim 1 wherein the skirt extends to or through the inner cap plane around a full circumference of the skirt.

7. The cap of claim 1 wherein the inner cap rim lies in the inner cap plane around a full circumference of the inner cap.

8. The cap of claim 1 wherein the inner cap is formed from an inner cap material with an elastic modulus which is higher than the second elastic modulus.

9. The cap of claim 1 wherein the skirt is attached to the outer cap body by a joint comprising a male part received in a groove which runs round a circumference of the cap.

10. The cap of claim 1 wherein the skirt extends through the inner cap plane around a majority of a circumference of the skirt.

11. The cap of claim 1 wherein the skirt extends to the inner cap plane around a majority of the circumference of the skirt so that the skirt rim lies in the inner cap plane around a majority of the circumference of the skirt.

12. The cap of claim 1 wherein the skirt rim lies in a single plane around a majority of the circumference of the skirt except where the skirt rim is formed with one or more recesses.

13. A joint comprising: a structure; an end of a fastener protruding from the structure; and a cap according to claim 1 forming a sealed cavity around the end of the fastener, the cap comprising a head of sealing material in the annular pocket which secures the cap to the structure.

14. The joint of claim 13 wherein the skirt rim contacts the structure.

15. The joint of claim 13 wherein the inner cap rim contacts the structure.

16. A method of assembling the joint of claim 13, the method comprising: fitting the cap over the end of the fastener; and after the cap has been fitted over the end of the fastener, feeding a flow of sealing material into the annular pocket via the flow space to form the bead of sealing material.

17. The method of claim 16 wherein the flow of sealing material is fed into the annular pocket via the flow space by injecting it through an inlet hole in the outer cap.

18. The method of claim 16 wherein the skirt rim contacts the structure, and the skirt flexes as the flow of sealing material is fed into the annular pocket so that the skirt rim lifts up to form a gap between the skirt rim and the structure which enables air to escape the annular pocket by flowing through the gap.

19. The method of claim 16 wherein prior to fitting the cap over the end of the fastener the skirt extends through the inner cap plane around a majority of a circumference of the skirt, and when the cap is fitted over the end of the fastener the skirt rim contacts the structure before the inner cap rim contacts the structure and then the skirt flexes to enable the inner cap rim to contact the structure.

20. A method of manufacturing the cap of claim 1, the method comprising co-bonding the skirt and the outer cap body.

* * * * *